Patented July 3, 1945

2,379,441

UNITED STATES PATENT OFFICE 2,379,441

SOYBEAN FOOD CONCENTRATE AND METHOD OF PREPARATION

Arnold A. Kaehler, Red Wing, Minn.

No Drawing. Application May 17, 1943, Serial No. 487,331

4 Claims. (Cl. 99—98)

This invention relates to a new food preparation or product particularly well adapted for blending with flour and shortening for baking purposes and equally adapted for use as a meat extender, or as a base for crackers, or ready-to-eat, precooked cereals.

It is an object of my invention to provide a palatable food preparation or concentrate containing a relatively large amount of soybean grits, high in protein content and vitamins, and having when eaten and/or mixed with other foodstuffs, little if any of the characteristic taste or odors of soybeans.

More specifically it is an object to provide a food mixture, the ingredients of which are of high protein and vitamin content including a relatively large proportion of soybean product and wherein the undesirable and characteristic taste of the soybean is neutralized and submerged to the extent that it cannot be detected when moisture is added to the mixture or when the mixture is blended with flour and other foodstuffs including meat and subsequently cooked and eaten.

Another object is the provision of such a food preparation in raw, dry state which will have material advantages in the production of bakery products, both in increasing the volume and texture of such products, as well as in providing additional shortening medium and protein content.

A further object is the provision of a simple, unexpected and highly efficient method for treating soybean ingredients, such as soybean grits, to submerge and neutralize the undesirable bitter natural soybean taste and to thus make available soybean products for practical use in foodstuffs.

These and other objects and advantages of the invention will be more fully set forth in the following description:

For many years efforts have been made to utilize soybean flour and other products obtained from soybeans, such as soy grits in bakery products, foodstuff blends and the like. Such efforts have been attended with poor results where any considerable proportion of soybean products had been used. The characteristic and undesirable bitter soybean taste had been predominant and according to a number of authorities it has been impractical to use more than 3% of the soybean product by weight in a flour mixture with satisfactory results as to taste and texture.

After exhaustive experimentation with soybean ingredients, such as soy grits and soybean flour, I have unexpectedly discovered that the aleurone particles or granules obtainable from the second or third break in the milling of wheat when intimately mixed with soy grits with the addition of moisture substantially neutralize and submerge the natural bitter taste and odor which has been objectionable in soybean food products and which heretofore, to my knowledge, has been present even in cooked food products containing soy grits or soybean flour where the product has been mixed with other food ingredients, such as meats, flour and other cereals. My discovery has further convincingly shown that the said aleurone particles from the wheat berry when mixed in relatively dry condition with soybean grits will check or retard fermentation of the soybean ingredients in the packaged product or for bakery use until yeast, shortening and moisture is added for baking purposes and will result in the production of increased volume and texture of bakery products made therefrom, as well as in the provision of some small addition of shortening medium and of course the desirable addition of a relatively large proportion of protein.

In the usual practice of adding soybean flour to wheat flour, the soybean flour has ability of absorbing a higher proportion of moisture than the wheat flour which causes certain complex chemical reactions in the fermentation processes which are detrimental in baking. When soy grits are added in granular form, mixed with aleurone granules, absorption of moisture by the soy ingredients is retarded with the result that the undesirable chemical reactions between components of the wheat flour and soybean ingredients are materially reduced, resulting in bakery products of improved texture and volume.

The aleurone layers of the wheat berry include the covering layers or skins surrounding the starch cells, gluten and germ of the wheat and include, within the meaning of the term as herein used, the aleurone cells, the episperm layer, the testa, the endocarp and the epicarp layers of the natural berry. In the milling of wheat flour and by-products, the aleurone particles or granules may be obtained and are usually separated off in the second or third breaks of the milling process. These particles are of substantially similar size to the usual soy grit particles, both varying from 14 to 20 mesh. The aleurone particles are substantially free from starch cells but contain some small amounts of gluten which is desirable for baking purposes.

In the preparation of a suitable product or concentrate for commercial use the proportions of soy grits and aleurone granules may be varied considerably with the production of good results.

I have found that the two ingredients intimately mixed preferably through mechanical mixing or agitation in the proportion of 50% soy grits and 50% aleurone granules by volume produces excellent results for use in blending with various foodstuffs, such as meat, flour, vegetable materials and concentrated milk products. Bakery products such as bread, rolls, cookies, crackers and the like, wherein flours, shortening material and other ingredients are blended, have excellent baking characteristics, are palatable and are, as far as detectable, free from any objectionable bitter characteristic soybean flavors. As a meat extender my improved product has been found excellent.

I further discovered that when my preparation is mixed with concentrated milk products and baked to form hard loaves, or crackers, and this material ground to proper size for cereal use, that an excellent pre-cooked prepared cereal may be obtained.

In all instances the ultimate food products produced after cooking are free from all objectionable characteristic soy taste. It is believed that in the mixing of aleurone particles with soy grits and moisture and subsequently in the cooking processes, chemical reactions between elements of the said ingredients take place which cause neutralization and submergence of the characteristic soybean flavors. Intimate mixing of the ingredients, soy grits and aleurone particles is desirable in the preparation of the concentrate to produce the best results. The said ingredients packaged in comparatively dry state have excellent preservative qualities and may be shipped or handled or stored for all necessary commercial purposes without deterioration or rancidity. In using the preparation or concentrate as soon as moisture is added thereto even to the extent of chewing the raw preparation, the neutralization and submergence of the characteristic soybean flavor is effected. Further neutralization and submergence occurs during the preparation of dough or the blending of the concentrate with moisture and other food products and in the subsequent cooking operation.

From the foregoing description it will be apparent that I have produced a new soybean preparation or concentrate well adapted for blending with foodstuffs and particularly well suited for baking purposes as a meat extender or base for ready-to-eat cereals.

It will further be seen that I have discovered a simple, unexpected method for treating soybean grits to submerge and neutralize the undesirable bitter natural taste and thus make available soybean ingredients for palatable use in various foodstuffs.

What is claimed is:

1. A food product high in protein content and vitamins comprising, a homogeneous mixture of soy particles and granules from the aleurone layers of wheat, said aleurone granules neutralizing and submerging the undesirable taste characteristics of the soybean products.

2. A food preparation of high protein and vitamin content comprising, only an intimate mixture of soy particles and granules obtained from the aleurone layers of wheat berries, said particles and granules being of substantially similar size and specific gravity, said granules, when moisture is added to said preparation, neutralizing and submerging the undesirable taste characteristics of soybeans.

3. A palatable food concentrate high in protein content and vitamins comprising, an intimately mixed combination of soy grits and granules obtained from the aleurone layers of wheat berries, said granules being comparatively free of starch cells, said grits and granules being of substantially similar size and said aleurone granules neutralizing and submerging the undesirable taste characteristics of soybean products when moisture is added to said mixture, said aleurone granules constituting at least 50% by weight of the mixture.

4. The method of treating soybean particles to submerge and neutralize the undesirable natural bitter taste thereof which consists in very intimately mixing therewith a quantity of particles obtained from the aleurone layers of wheat berries and subsequently in preparing food products therefrom adding moisture.

ARNOLD A. KAEHLER.